US000001044H

United States Statutory Invention Registration [19]

[11] Reg. Number: H1044

Waters

[43] Published: Apr. 7, 1992

[54] METHOD AND APPARATUS FOR PRECISION RANGING USING STABLE CLOCKS

[75] Inventor: William M. Waters, Millersville, Md.

[73] Assignee: United States of America, Washington, D.C.

[21] Appl. No.: 635,022

[22] Filed: Dec. 28, 1990

[51] Int. Cl.[5] ..... G04C 11/02; G01S 13/08

[52] U.S. Cl. ..... 368/47; 342/125

*Primary Examiner*—Linda J. Wallace

*Attorney, Agent, or Firm*—Thomas E. McDonnell; Edward F. Miles

[57] ABSTRACT

Methods for accurately measuring the range between two platforms with relative motion between them using a stable clock located on each platform. A series of pulses are sent from one platform to the other at times known to each platform by prearrangement, the arrival times measured, and statistical methods used to calculate a correction from the clocks to bring them into greater synchronization, thus allowing highly accurate determination of the range between the two platforms.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR PRECISION RANGING USING STABLE CLOCKS

FIELD OF THE INVENTION

The invention relates in general to range and more particularly to high accuracy range determination between two platforms which may have a relative motion between them.

BACKGROUND OF THE INVENTION

Military maneuvers at sea, such as landing aircraft on the flight deck of an aircraft carrier or precision station keeping, require that at least one platform knows the distance to another, reference platform with a high degree of accuracy. Plainly, the more accurately this can be done, the better.

SUMMARY OF THE INVENTION

Accordingly, it is an object of the present invention to provide ranging information with much higher accuracies than conventional methods.

It is a further object of the present invention to provide highly accurate ranging information using a minimum amount of equipment on the platform measuring the distance to the reference platform.

It is still a further object of the present invention to determine the relative range between two platforms, one or more of which may be moving, by measuring the signal transmission delay referenced to time measured by stable clocks, one clock being located on each platform.

Another object is to synchronize the clocks more accurately than has been heretofore possible.

Another object is to determine the relative range between two platforms, one or more of which may be moving, wherein one platform, the reference platform, provides the second platform with an estimated range of the distance between the two platforms.

Another object is to determine accurately the range between two platforms, one or both of which may be moving, where the distance to the reference can be roughly estimated by the second platform.

These and other objects and advantages are achieved in accordance with the present invention by a method for (1) synchronizing first and second clocks which are out of synchronization by an amount $\Delta$, and for: using the greater synchronization to determine more accurately the range between a first and a second platform associated respectively with the first and second clocks. The synchronizing entails sending N signals, numbered $n=1, 2 \ldots, N$, from the first platform to the second platform at times known to each platform by prearrangement, and, for each nth one of N signals, making an estimate $\tau_n$ of the time of flight of the signal from the first platform to the second platform, transmitting the signal at time $t_n-\tau_n$, $t_n$ being the expected arrival time for the nth signal as measured by said first clock, and determining $t'_n$, where $t'_n$ is the actual time of signal arrival at the second platform as measured by the second clock. Thereafter, this information is use to calculate $$\hat{\Delta} = (1/N) \sum_{n=1}^{N} (t'_n - t_n);$$

and either (a) reset the second clock by a time $\hat{\Delta}$, or (b) rest the first clock by a time $-\hat{\Delta}$. With the clocks more closely synchronized by an amount $\hat{\Delta}$, one then can send an additionally signal from one of the platforms to the other at a preselected time known to each platform a priori by prearrangement, use the clock located on the other platform to measure the arrival time of the additional signal at the other of platforms, and then use the difference between the preselected time and the arrival time to determine the range between the first and second platforms.

BRIEF DESCRIPTION OF THE DRAWINGS

These and other objects, features and advantages of the present invention are disclosed in or apparent from the following detailed description of the preferred embodiments, presented in conjunction with the accompanying drawings, in which.

DETAILED DESCRIPTION

Figure 1:
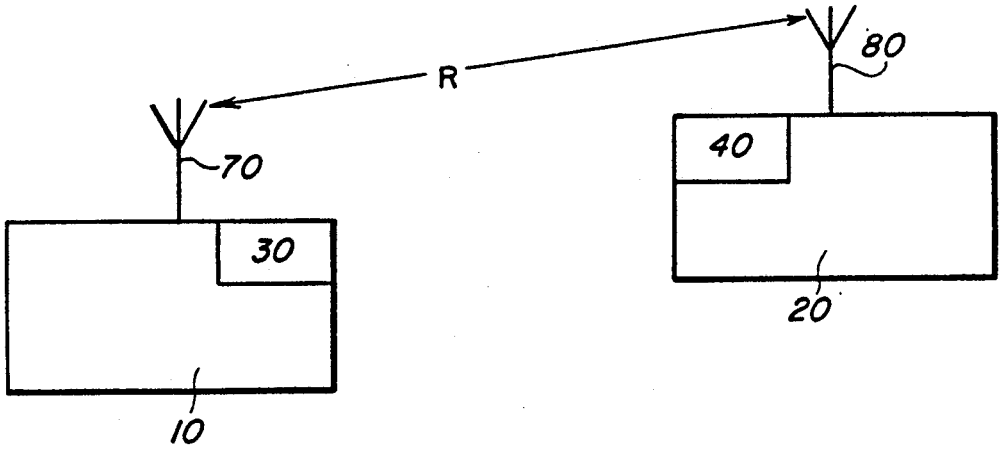
FIG. 1 is a schematic diagram illustrating operation of the invention.

With particular reference to FIG. 1, platforms 10 and 20 each have associated with them respective clocks 30, 40, and facilities 70, 80 for transmitting pulses between 10 and 20. Clocks 30, 40 are out of synchronization by an amount $\Delta$, which does not change during the following procedures.

Platform 10 sends a series of N pulses to platform 20, the expected arrival time of these pulses being known to each platform a priori by prearrangement. Thus, at each time $t_n-\tau_n$, platform 10 sends such a pulse, where $n=1, 2, \ldots, N$, $\tau_n$ is the estimate of the time of flight of the nth pulse from platform 10 to 20, $\tau_n=R_n/c$, $R_n$ is the estimate of the range between platforms 10 and 20 prior to sending the nth pulse, c is the velocity of the pulse (e.g. the speed of light for a radar system), and $t_n$ is the time at which the nth pulse is expected to arrive at platform 20, as measured by clock 30. Platform 20 uses its clock 40 and conventional ranging techniques to measure the range R between 20 and 30, and this measurement is made continuously during transmission of the N pulses to provide the values of $R_n$.

As measured by clock 40, the nth pulse arrives at time $t'_n$, where:

$$t'_n=t_n+\Delta+\Delta\tau_n$$

and where $\Delta\tau_n$ is the error in estimate $\tau_n$. Rearranging terms:

$$t'_n-t_n=\Delta+\Delta\tau_n$$

Averaging over the N pulses:

$$(1/N) \sum_{n=1}^{N} (t'_n - t_n) = (1/N) \sum_{n=1}^{N} (\Delta + \Delta\tau_n)$$

Because N, $t'_n$, and $t_n$ are known, one can calculate the left side of this equation. Thus, calling the left side $\hat{\Delta}$:

$$\hat{\Delta} = (1/N) \sum_{n=1}^{N} (\Delta + \Delta\tau_n)$$

But, because $\Delta$ is constant:

$$\hat{\Delta} = \Delta + (1/N) \sum_{n=1}^{N} \Delta\tau_n$$

-continued $$\text{Defining } \hat{\Delta}\tau = (1/N) \sum_{n=1}^{N} \Delta\tau_n$$

$$\Delta = \Delta + \Delta\tau$$

Because $\Delta\tau$ is an error function, its mean value should be zero; and as N approaches infinity, $\Delta\tau$ goes to zero and $\hat{\Delta}$ becomes identically equal to $\Delta$. Thus for a large number of pulses, the calculated value $\Delta$ becomes a good estimate of the actual difference in synchronization between clocks 30, 40. By resetting 40 an amount $\hat{\Delta}$, or 30 by an amount $-\hat{\Delta}$, one effectively synchronizes 30 and 40.

In order to give an idea of how quickly $\hat{\Delta}$ approaches $\Delta$, if one assumes that $\Delta\tau$ is normally distributed, then the standard deviation of the expression for $\hat{\Delta}$ falls off proportionate to $1/N^{\frac{1}{2}}$.

Thereafter (or interleaved with the N pulses), platforms 10, 20 will preferably exchange one or more additional pulses, again at times known to each platform a priori by prearrangement, and record the arrival time of the pulse(es) at the receiving platform. The time recorded, and the prearranged knowledge of when the additional pulses were sent, permits the receiving platform to calculate the range between it an the other platform. Because the clocks on the platforms have been more closely synchronized, this range measurement is more accurate.

It is therefore to be understood that the present invention may be practiced in other ways than those specifically described herein without departing from the spirit or scope of the invention.

I claim:

1. A method for synchronizing a first and a second clock, each said clock being associated with a respective one of a first and a second platform, said method comprising:

sending N signals, numbered n = 1, 2, . . ., N, from said first platform to said second platform; wherein for each nth one of said N signals, the expected arrival time of said nth one of said N signals at said second platform being known a priori:

making an estimate $\tau_n$ of the time of flight of said nth one from said first platform to said second platform;

transmitting said nth one at time $t_n - \tau_n$, $t_n$ being said expected arrival time for said nth one as measured by said first clock; and determining $t'_n$, where $t'_n$ is the time of arrival of said nth one at said second platform as measured by said second clock;

wherein said method further comprises:

$$\text{calculating } \hat{\Delta} = (1/N) \sum_{n=1}^{N} (t'_n - t_n); \text{ and}$$

either (a) resetting said second clock by a time $\hat{\Delta}$, or (b) resetting said first clock by a time $-\hat{\Delta}$.

2. A method for determining the range between a first and a second platform having associated respective first and second clocks, said method for determining comprising:

synchronizing said first and said second clocks, said synchronizing comprising:

sending N signals, numbered n = 1, 2, . . ., N, from said first platform to said second platform; wherein for each nth one of said N signals:

making an estimate $\tau_n$ of the time of flight of said nth one from said first platform to said second platform;

transmitting said nth one at time $t_n - \tau_n$, $t_n$ being the expected arrival time for said nth one as measured by said first clock; and determining $t'_n$, where $t'_n$ is the actual time of arrival of said nth one at said second platform as measured by said second clock;

wherein said synchronizing further comprises:

$$\text{calculating } \hat{\Delta} = (1/N) \sum_{n=1}^{N} (t'_n - t_n); \text{ and}$$

either (a) resetting said second clock by a time $\hat{\Delta}$, or (b) resetting said first clock by a time $-\hat{\Delta}$;

wherein said method for determining said range further comprises:

sending an additional signal from one of said first or said second platform to the other of said first or said second platforms at a preselected time known to each of said platforms a priori by prearrangement;

using said clock associated with said other of said platforms to measure the arrival time of said additional signal at said other of said platforms;

using the difference between said preselected time and said arrival time to determine said range between said first and said second platforms.

* * * * *